UNITED STATES PATENT OFFICE.

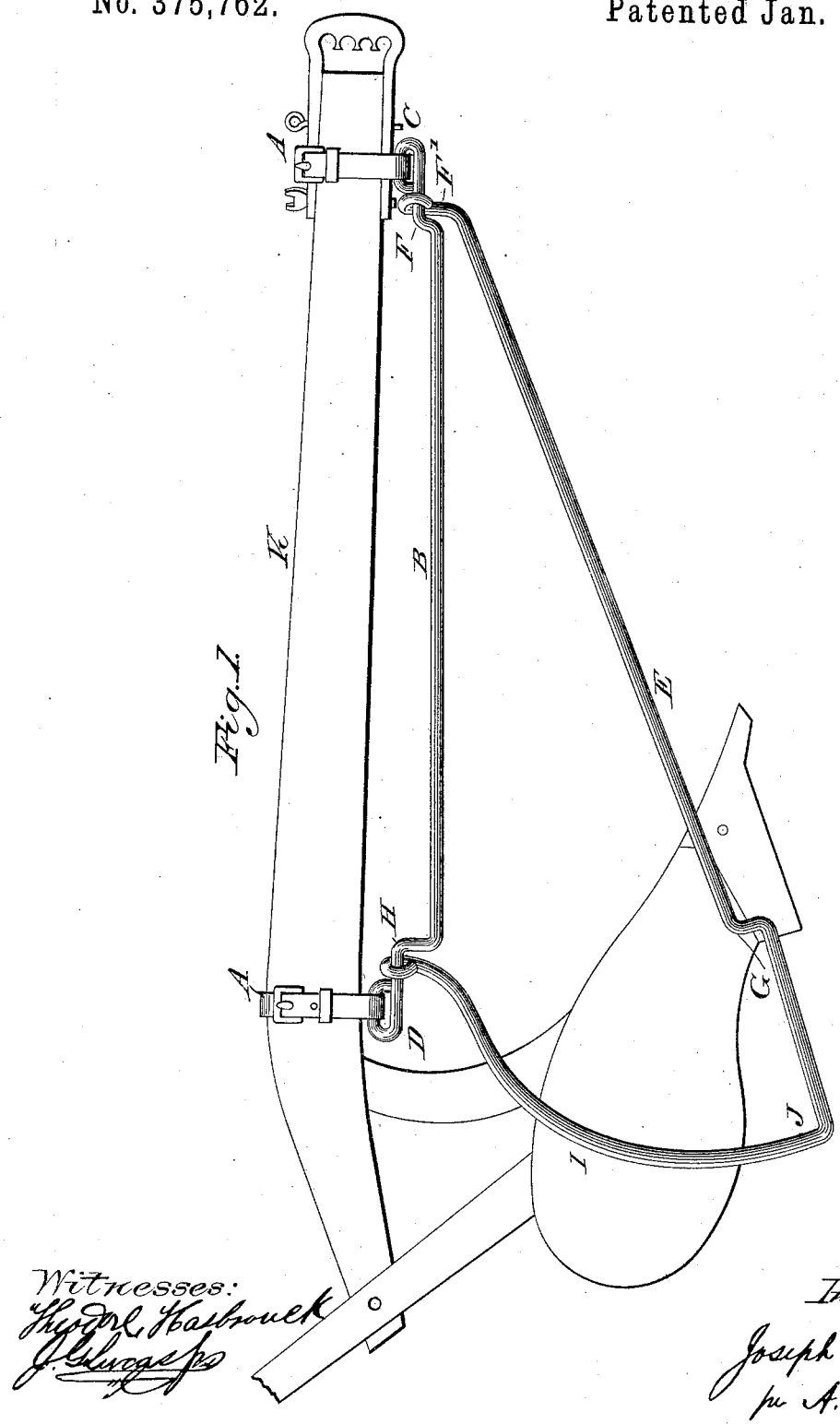

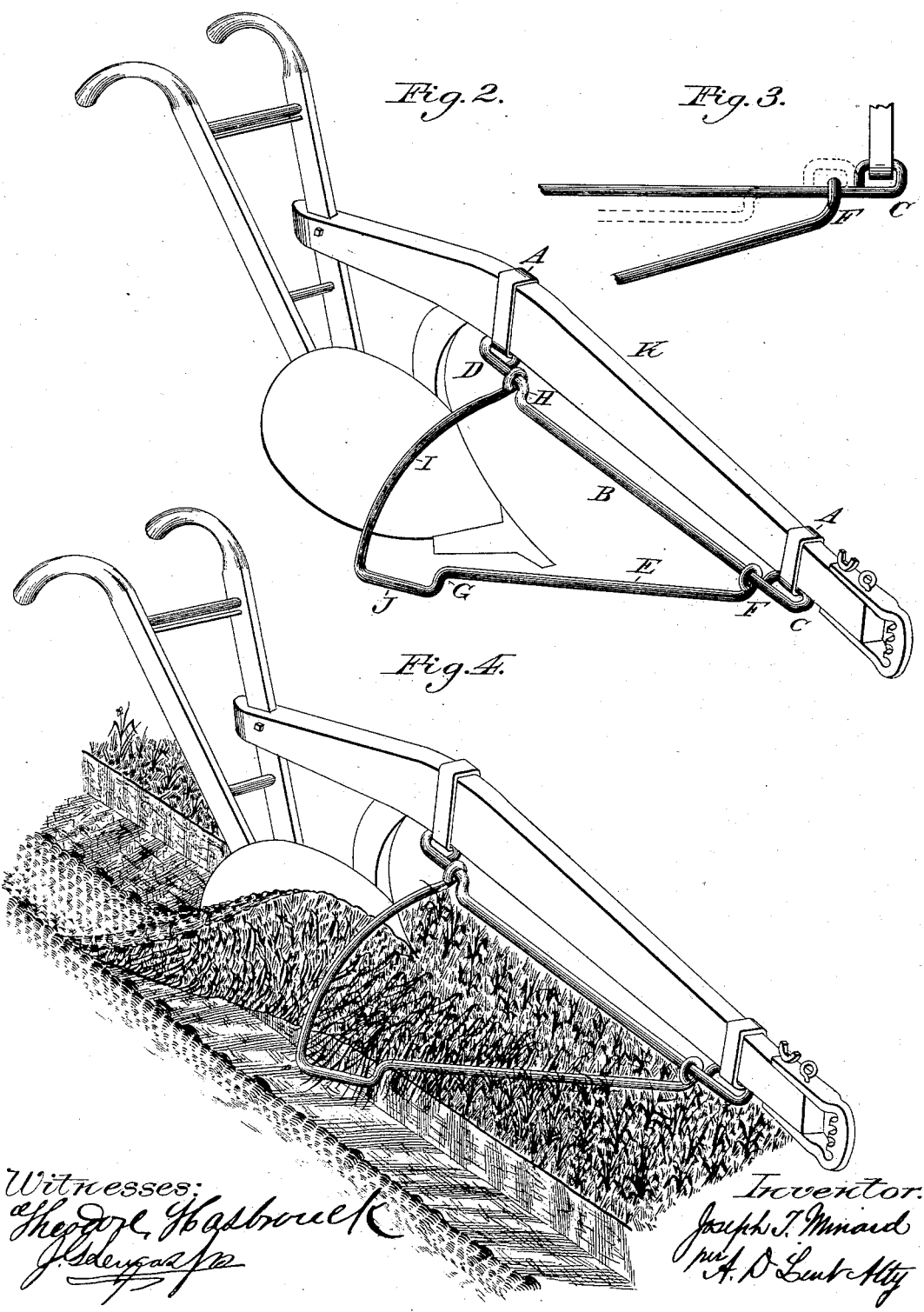

JOSEPH T. MINARD, OF HIGHLAND, NEW YORK.

PLOW ATTACHMENT.

SPECIFICATION forming part of Letters Patent No. 375,762, dated January 3, 1888.

Application filed August 27, 1886. Serial No. 212,029. (No model.)

*To all whom it may concern:*

Be it known that I, JOSEPH T. MINARD, a citizen of the United States, residing at Highland, Ulster county, New York, have invented a new and useful Attachment for Plows for the purpose of turning under weeds, grass, or other vegetable growth while plowing; and I do hereby declare that the following is a full, clear, and exact description of the construction and operation of the same, reference being had to the annexed drawings, viz.

Figure 1 is a side view of the attachment from the right side of the plow. Fig. 2 is a front perspective view of the same. Fig. 3 is a section of Fig. 1, showing a different mode of uniting the two rods of the attachment to prevent sliding or slipping upon either rod. Fig. 4 is an illustration of the attachment in operation.

B represents a rod, of iron, steel, or other suitable material, bent at F and H, as shown in Fig. 1, to prevent the rod E slipping upon it. The rod B is also formed into loops at C and D to receive the straps A A, which fasten the attachment to the plow-beam K, as shown by drawings in Fig. 1.

E represents a rod, of like material as the rod B, formed into loops at F and H, where it is attached to the rod B. It is also bent at F, G, and J to form the angles, as shown in the drawings. The portion at I of the rod E is curved outward from the plow a sufficient distance to permit the furrow to pass between the mold-board of the plow and the rod. The size of rods used is about three-eights to three-fourths of an inch in diameter, and in length to correspond to the size and pattern of the plow used. The straps A A may be made of either leather or metal.

The mode of operation is simply to fasten the attachment to the plow-beam K, as shown in Fig. 1, adjusting it proportionately to the size, length, and pattern of the plow used, so as to correspond as near as possible to the adjustment shown in the drawings, letting the rod B fall a little below the plow-beam, as shown. When so adjusted, the plow may be used in every and any ordinary or usual way without hinderance either in striking obstructions or catching the lower limbs or bodies of trees, branches of vines, bushes, or tearing up growing plants in consequence of the attachment. When in operation, the attachment gradually inclines the weeds or vegetable growth desired to be plowed under over in the furrow, and the angle G in the rod E pulls ahead and under whatever growth might otherwise be too long to be covered by the falling furrow.

What I claim, and desire to secure by Letters Patent, is—

A plow attachment consisting of the rod B, formed with eyes at either end, and with the angular bends F H, the rod E, hinged to the rod B at said bends, having the bend G and angles F' J, and the curved rear portion, I, in combination with the flexible straps A A and the plow-beam K, substantially as shown and described.

JOSEPH T. MINARD.

Witnesses:
WILLIAM E. WILCOX,
S. G. CARPENTER.